No. 854,150. PATENTED MAY 21, 1907.
L. E. DARST & W. H. HARRELSON.
ADJUSTING WHEEL FOR SWINGLETREES OR DOUBLETREES.
APPLICATION FILED AUG. 21, 1905.
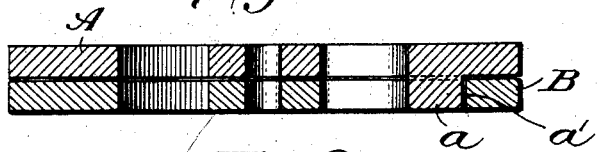
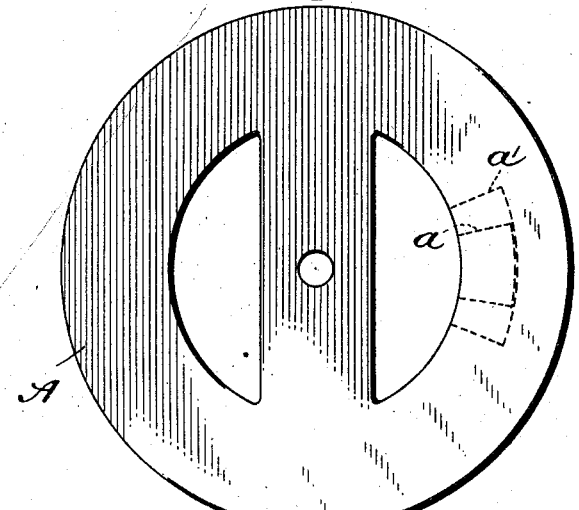
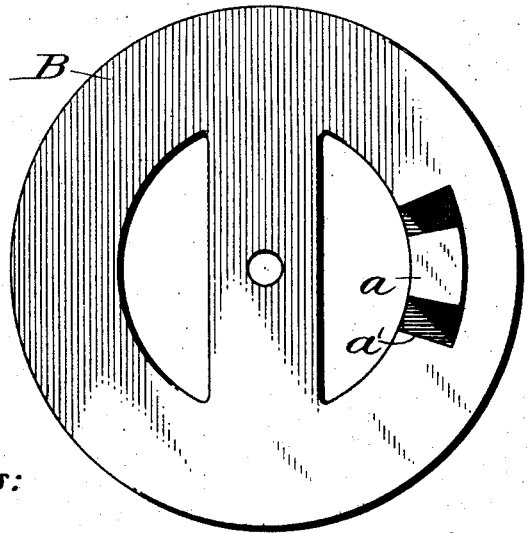

UNITED STATES PATENT OFFICE.

LUTHER EDWARD DARST, OF LOUISIANA, AND WILLIAM HENRY HARRELSON, OF CYRENE, MISSOURI.

ADJUSTING-WHEEL FOR SWINGLETREES OR DOUBLETREES.

No. 854,150.     Specification of Letters Patent.     Patented May 21, 1907.

Application filed August 21, 1905. Serial No. 275,168.

*To all whom it may concern:*

Be it known that we, LUTHER EDWARD DARST, of Louisiana, in the county of Pike and State of Missouri, and WILLIAM HENRY HARRELSON, of Cyrene, in the county of Pike and State of Missouri, have invented a new Adjusting-Wheel for Swingletrees or Doubletrees; and we do hereby declare the following to be a full and exact description of the same, reference being had to the accompanying drawings, forming part of this specification, in which—

Figure 1 is a vertical section of the two plates which compose the wheel; Fig. 2 is a top plan elevation of the wheel; and Fig. 3 is a bottom plan elevation of the wheel.

Similar letters of reference in the accompanying drawings denote the same parts.

Our invention has for its object to provide an improved connection for swing trees or double trees to the draft pole of a buggy, carriage or other light vehicle, so as to dispense with stay chains or straps, and at the same time provide a more secure fastening of the swingle tree or double tree to said draft pole.

In the accompanying drawings, A is the top plate which is to be fastened to the under side of the swingle tree or double tree. This plate has an integral lug, $a$, on the under side which works in a recess, $a'$, in plate B, in such a manner as to limit the play of the ends of the swingle tree or double tree. By thus preventing either end of the swingle tree or double tree from being pulled more than a few inches ahead of the other end, the use of stay chains or straps is obviated. As stay chains or straps are costly, clumsy and unsightly, this is an improvement of value for fine vehicles. As the chief strain on swingle tree or double tree is at the point where same is attached to the draft bar, this adjusting wheel, by strengthening same at this point, will be a valuable improvement and as the wheel extends a few inches in front of this point of strain and a few inches back of said point of strain, it reduces the liability of the draft bar to be pulled over and thus have the bolt or fastening pulled from its place.

We are aware that prior to our invention other devices have been in use to obviate the use of stay chains. We, therefore, do not claim the device broadly, but

We claim as a new and useful improvement,

The combination with the plate A. having the integral lug, $a$, of the plate B. having the recess, $a'$, for joint operation in connection with a swingle tree or double tree substantially as described.

LUTHER EDWARD DARST.
           WILLIAM HENRY HARRELSON.

Witnesses:
    SAM SPARROW,
    G. T. PETTIBONE.